March 28, 1967 L. M. JONES 3,311,216
EGG PACKING APPARATUS
Filed Oct. 4, 1965 3 Sheets-Sheet 2
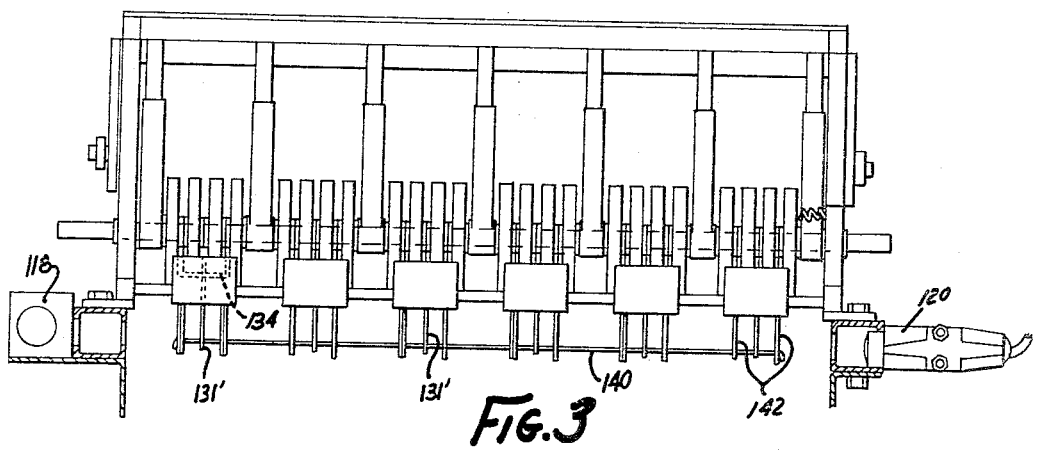
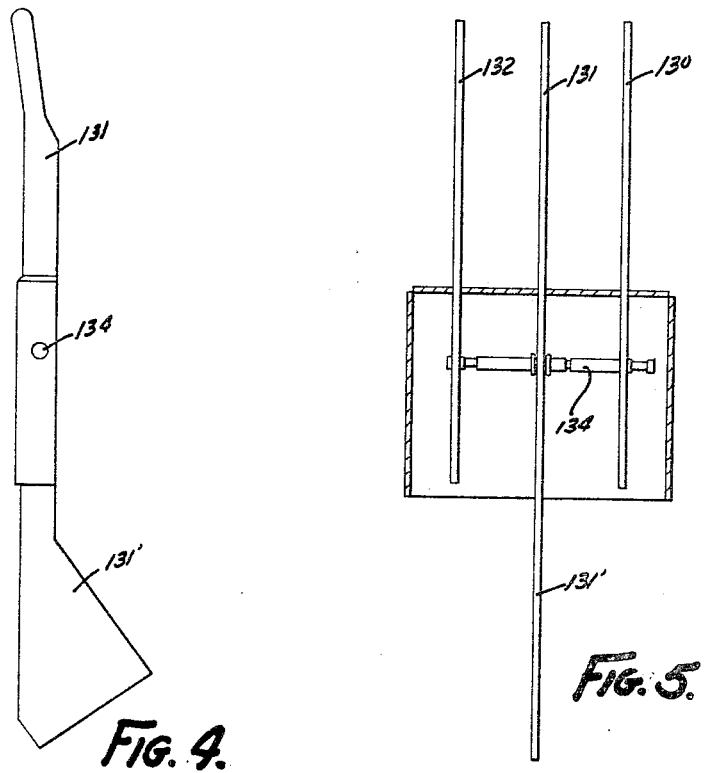
INVENTOR.
LEONARD MAX JONES
BY
ATTORNEYS March 28, 1967 L. M. JONES 3,311,216

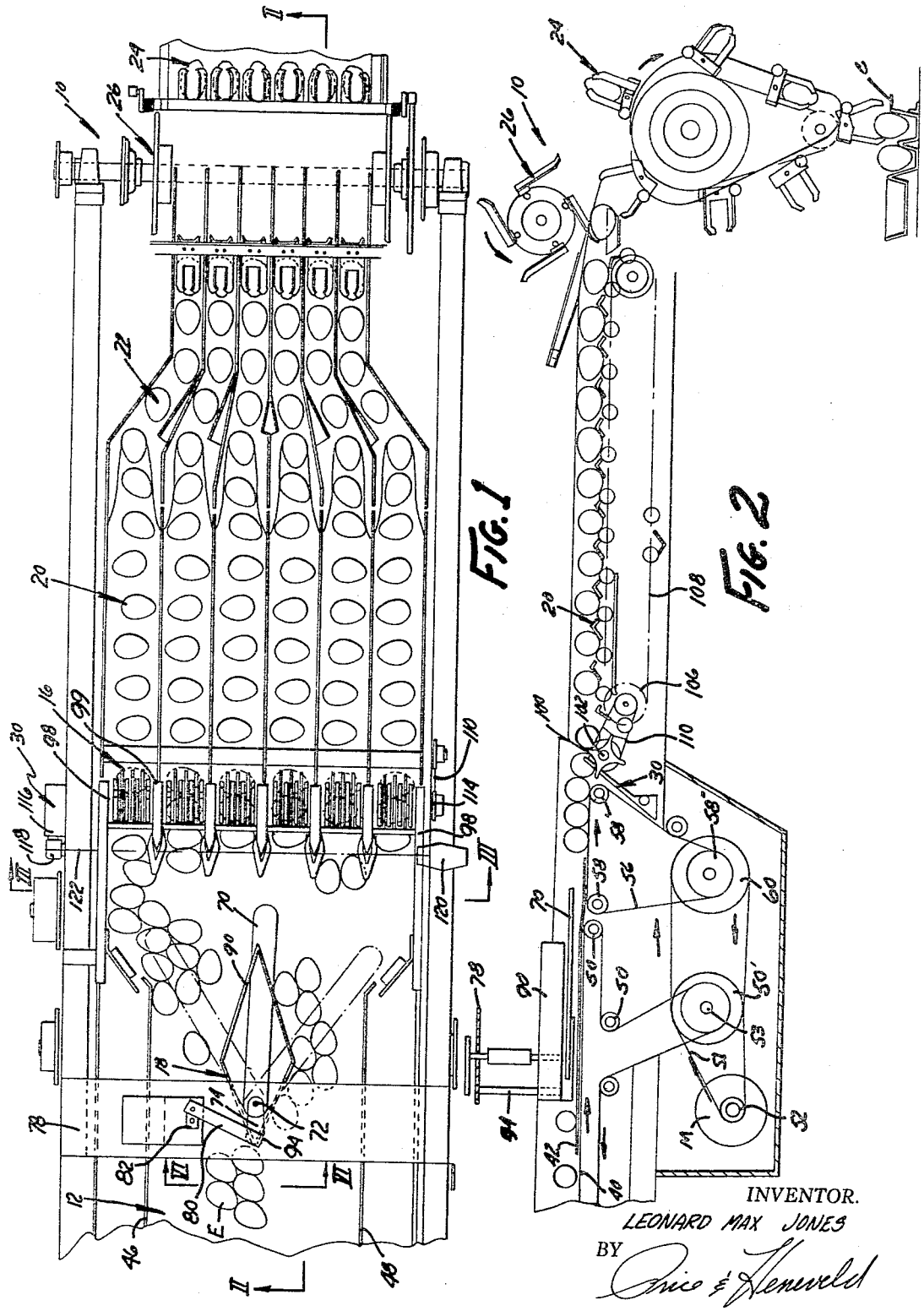

EGG PACKING APPARATUS

Filed Oct. 4, 1965 3 Sheets-Sheet 3

INVENTOR.
LEONARD MAX JONES
BY
ATTORNEYS

United States Patent Office 3,311,216
Patented Mar. 28, 1967

3,311,216
EGG PACKING APPARATUS
Leonard Max Jones, Ottumwa, Iowa, assignor to Barker Poultry Equipment Co., Ottumwa, Iowa, a corporation of Iowa
Filed Oct. 4, 1965, Ser. No. 492,529
7 Claims. (Cl. 198—30)

This invention relates to an egg packing apparatus, and more particularly to an improved automatic egg handling machine having unique egg row forming means and egg distributor means to said row forming means.

In order to automatically pack specific numbers of eggs in receiving containers such as cartons or flats, the individual eggs must be controllably placed into groups of selected numbers, and then advanced as a group to the containers. Various mechanisms for doing this have been devised heretofore, with the grouping controller being actuated by mechanical tripping of a series of electrical switch levers by individual eggs, so that, when the predetermined number of eggs is grouped, they are advanced as a group by actuated advancing means.

Because eggs are relatively fragile, and have a peculiar ovoid configuration, a need has been shown for an improved grouping device, particularly in the actuation of the advancer upon the grouping of the predetermined number of eggs.

Another critical zone of the packer is at the distributor feeding the eggs to the grouping or row forming means. Eggs tend to be crushed or cracked in this zone during high volume operation.

It is an object of this invention to provide an improved egg packer apparatus that has unique handling and operating characteristics particularly suited to the peculiarities of eggs. The apparatus specifically employs unique grouping control means particularly suitable for eggs to assure excellent operational control and dependability.

Another object of this invention is to provide a novel highly sensitive egg row forming and advancing means employing photoelectric detecting and actuating means in a unique manner.

Another object of this invention is to provide egg handling apparatus having improved distributing control over the individual eggs feeding into the row forming mechanism, to minimize egg crushing and back binding on the feed apparatus in the advancing conveyor.

Another object of this invention is to provide an improved egg transfer regulating means from the group conveyor into container filling depositors.

These and other objects of this invention will become apparent upon studying the following specification in conjunction with the drawings in which:

FIG. 1 is a plan view of the egg handling and packing apparatus;

FIG. 2 is a sectional view of the apparatus in FIG. 1, taken on plane II—II;

FIG. 3 is a sectional view of the apparatus in FIG. 1, taken on plane III—III;

FIG. 4 is an enlarged side elevational view of one of the predetermined number of egg detectors used in the apparatus;

FIG. 5 is a front elevational view of the detector in FIG. 4;

Figure 6:
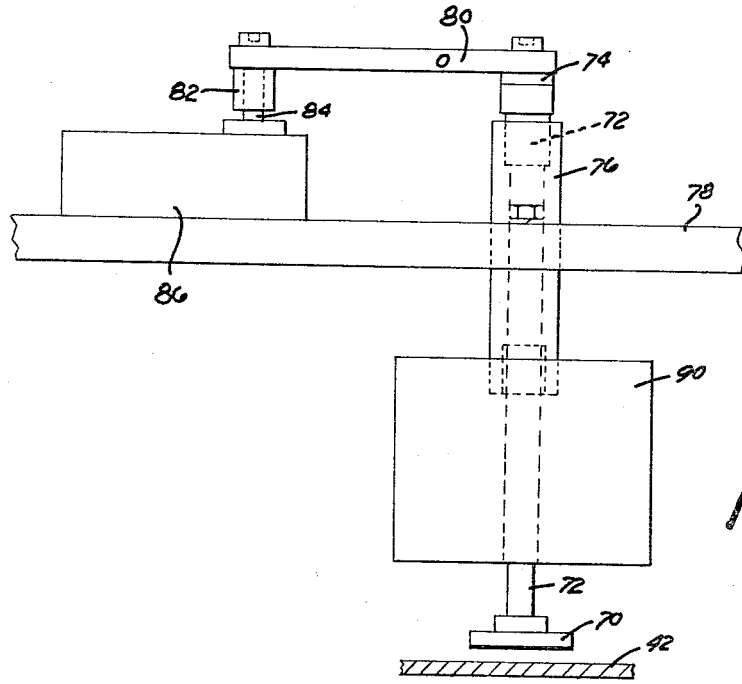
FIG. 6 is an enlarged sectional view of the apparatus in FIG. 1 taken on plane VI—VI.

Referring now specifically to the drawings, the egg packing assembly 10 (FIGS. 1 and 2) basically includes egg conveying means 12 feeding random eggs to an egg accumulator means 14 that includes distributor means 18 that supplies eggs to grouping or row forming means 16. Downstream of the egg row forming means is row advancing means 20, egg row realignment means 22, and egg transfer means 26 to depositor means 24.

The areas of improvement occur in the distributor means 18 and its cooperation with the accumulator means, and in the control means 30 for the egg row forming means.

The conveyor means 12 includes a suitable endless conveyor belt 40 to convey a great number of randomly oriented eggs E from any suitable loading point or points to accumulator means 14. The accumulator means, essentially comprising a gathering area at the discharge end of the conveyor at which the eggs accumulate for cooperation with the distributor and for entry into the egg row forming means. A pair of vertical side panels 46 and 48 (FIG. 1) limit the side movement of the eggs as they roll along the conveyor and onto the accumulator. Conveyor belt 40 is advanced around suitable idler pulleys 50 and drive pulley 50'. Pulley 50' is driven by a motor M through its pulley 52, belt 51, and pulley 50" on shaft 53. A supplemental short conveyor belt 56 is located at the discharge end of the main conveyor belt, to receive laterally spread or distributed eggs from platform 42 and advance them to the individual pockets of egg row forming means 16. This belt 56 passes around idler pulleys 58 and 58', and around a drive pulley 58" driven by coaxial pulley 60, which in turn is driven by belt 51 from pulley 50" on shaft 53.

The egg distributor 18 has an elongated bar type arm 70 extending generally longitudinally along the conveyor path and pivotally mounted at 72 on its upstream end, in the center of the conveyor. This bar is positioned a fraction of an inch above the conveyor to gently push the eggs transversely of the direction of movement of the conveyor, to spread them laterally on platform 42. This distributes eggs to all of the predetermined number of transversely arranged pockets (here six) in the row forming means 16. This bar is affixed to the lower end of pivot shaft 72. To the upper end of shaft 72 is connected a link 74. Pivot shaft 72 is retained in a bearing collar 76 (FIG. 6) secured to an elevated transverse support 78 above accumulator plate 42. Pivotally mounted to the second end of link 74 is one end of an elongated connecting rod 80. On the other end of rod 80 is attached a short crank 82 mounted to be rotated on a drive shaft 84 of a power motor means 86. Thus, operation of the motor causes the crank and rod to reciprocate the link 74, thereby sweeping arm 70 in an arcuate path back and forth across the accumulator portion of the conveyor means. The eggs being conveyed and accumulated are thus pushed laterally into the pockets of row forming means 16.

An important feature of this distributor means is the diamond shaped, upstanding guard 90 positioned above distributor bar 70, and fixedly mounted in its orientation generally longitudinally along the conveyor path of movement. It is mounted fixedly on its upstream end by a vertical support 94 that extends upwardly to transverse beam 78. This diamond shaped guard has two legs which are convergent toward the upstream direction, and two legs convergent toward the downstream direction. It has been found through extensive experimentation that this particular configuration has unique value in preventing eggs from being crushed during the distributing operation. It prevents back-jamming of the eggs against the distributor arm as it sweeps back and forth. The exact technical reasons why this is so are not completely understood, although it is believed that the diagonally slanted walls of the guard, with respect to the conveyor movement, serve to deflect the eggs in a manner preventing them from being pushed perpendicularly against a surface where they cannot shift.

As indicated previously, the eggs are distributed to row forming means 16. This row forming means has a plurality of a predetermined number of egg receiving pockets between a pair of outer straddling side walls 98 and 98', and a plurality of intermediate spaced walls 99. The eggs are guided into these individual pockets where they are retained by star wheel gate means until a predetermined number of eggs fills all of the pockets.

More specifically, a plurality of star wheels 100 are mounted in the receiving pockets to controllably advance the row of eggs being formed. Preferably, each pocket includes three cooperative spaced star wheel elements in order to provide optimum contact with the eggs. All of the star wheels are mounted on a common rotary shaft 102 which, when rotated, simultaneously rotates the star wheels. This rotation is limited to a 90° arc to pass only one row of eggs at a time. This group of star wheels, forming a retention and advancement means, and the downstream egg alignment conveyor means 20, are driven by a suitable electrical motor 106. The motor drives conveyor element 108 for egg alignment conveyor means 20, and through belt or chain 110, rotates star wheel sprocket 114.

Motor 106 is controlled by a photoelectric actuated relay 116. The relay is actuated by a photoelectric detector 118 which cooperates with a light beam source 120 oriented across the mechanism. The light beam source and detector are oriented transversely of the conveyor to form a beam path 122 thereacross, immediately adjacent the plurality of egg receiving pockets. Cooperative with this photoelectric detector means is a plurality of a predetermined number of egg detector elements shown in detail in FIGS. 3, 4 and 5. Each of these elements preferably includes a plurality of upstanding legs 130, 131, and 132 (FIG. 5) all pivotally supported on a rod 134, with center leg 131 having a downwardly protruding flag portion 131'. The three legs are employed in order to provide optimum egg contact. Portions 131 of the plurality of components basically constitute beam blocking flags which, in the absence of an egg in one of the respective pockets, are positioned in path 122 between the photoelectric source and detector. The lower portion is normally aligned with the beam by abutting a stop 140 which may constitute a bar 140 extending transversely of the units and mounted on straddling supports 142 adjacent each of the lower leg portions 131'.

Figure 7:
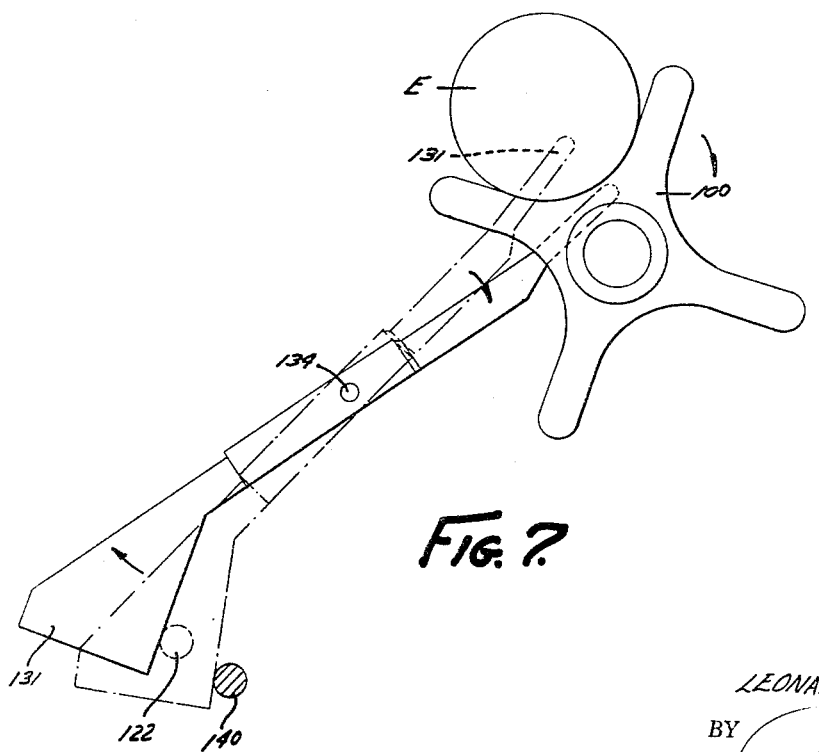
FIG. 7 is an enlarged view showing the cooperative relationship of the egg row advancing means and egg detector means in this apparatus.

The upper end of central leg 131 is positioned within the pocket itself so that the entry of the egg into the pocket shifts the upper end on the pivot axis 134. This relationship is illustrated specifically in FIG. 7. The shifting of upper portion 131 of each detector element upon the entry of an egg into the star wheel recess also shifts the respective lower portion in the opposite direction, so that lower flag portion 131' is moved from the position illustrated in phantom in FIG. 7 to the solid line position i.e. out of the photoelectric beam path 122.

When any one or more of the pockets have not received an egg, one or more of the detector beam blocking flags will remain in the path of the light beam to prevent actuation of relay 116. On the occurrence of the predetermined number of eggs in the predetermined number of pockets, all of the flags are shifted out of the beam path, causing the light beam from source 120 to actuate detector 118, thereby switching timing relay 116, to actuate motor 106 that operates the star wheels and alignment conveyor. This rotates the star wheels through a 90° angle by the temporary operation of relay, to advance one row of predetermined number of eggs from the row forming means.

The eggs then pass down alignment conveyor 20 in conventional fashion to transfer means 26 which rotates to pass a row of eggs simultaneously into the recirculatory egg packing means 24 with its reciprocatory cam operated jaws. It then deposits the eggs in row in suitable containers C (FIG. 2).

The operation of this apparatus is apparent from the detailed description hereinabove. Generally, as the eggs move down conveyor means 12, they are transferred onto the accumulator where they are distributed by the oscillatory arm 70. They then are pushed across the accumulator by following eggs to pass onto the small conveyor belt 56 which transfer them into the plurality of predetermined number of individual pockets of the egg row forming means. When all pockets have received an egg, the detecting elements pivot on their shaft to shift the lower portions from a beam blocking position to a non-blocking position. When all of the pockets have been filled, the beam transmits a signal which is detected to operate a timing relay that shifts the motor temporarily into operating condition for advancing one row of eggs by the rotating star wheels. The eggs are then advanced in rows down the alignment conveyor 20 through the reorientation means 22, to transfer means 26 for egg packing means 24. The operation has been found with extensive experimentation to be effective, smooth, high speed, and yet delicate for the fragile eggs involved.

Conceivably, various minor details of the construction may be modified within the scope of the claims presented. Hence the invention is intended to be limited only by the scope of the claims and the reasonably equivalent structures to those defined therein.

I claim:

1. In an egg packing apparatus having an infeed conveyor and a group advancement conveyor, an egg grouping means operable therebetween, comprising: a plurality of a predetermined number of egg receiving chambers; egg passage controlling gate means for said chambers; power means operably connected to operate said gate means; photoelectric trigger means operatively associated with said power means to trigger actuation thereof; a plurality of egg sensors for said chambers, shiftable with egg entry; and a plurality of photobeam blocking elements individually operated by respective ones of said sensors, and when all operated, allowing actuating of said trigger means for opening said gate means by said power means, causing simultaneous passage of the predetermined number of eggs.

2. In an egg handling apparatus including egg conveyor means: egg row forming means transversely of said conveyor means; said row forming means having a predetermined number of egg receiving pockets; gate means operable to normally retain eggs in said pockets, and shiftable to simultaneously advance all of said predetermined number of eggs; power means to shift said gate means when actuated; a predetermined number of individual egg detecting flag elements cooperative with respective ones of said pockets, each shiftable by the entry of an egg into its respective pocket; photoelectric source and detector actuator means oriented transversely of said conveyor adjacent said row forming means, operably associated with said power motor means through a relay to temporarily actuate said power motor means, and cooperative with all of said flag elements to actuate said power means only upon the shifting of all of said egg detecting means, to cause the advance of a row of predetermined number of eggs.

3. Egg grouping apparatus comprising: egg infeed means; egg group advancement means; egg grouping means between said infeed means and advancement means, including a plurality of a predetermined number of egg receiving chambers; egg passage controlling gate means for said chambers; power means operably connected to operate said gate means; photoelectric trigger means operatively associated with said power means to trigger actuation thereof and including a light beam source and a beam receiver aligned therewith; a pluraltiy of egg sensors for said chambers, shiftable with egg entry; and a plurality of photo beam blocking elements individually operated by respective ones of said sensors, and shiftable from a first position blocking the light beam from said source to said receiver, to a second non-blocking position allowing actuation of said trigger means for opening said gate means by said power means, causing simultaneous passage of the predetermined number of eggs.

4. In an egg handling apparatus including egg conveyor means: egg row forming means transversely of said conveyor means; said row forming means having a predetermined number of egg receiving pockets; gate means operable to normally retain eggs in said pockets, and shiftable to simultaneously advance all of said predetermined number of eggs; power means to shift said gate means when actuated; a predetermined number of individual egg detecting elements in respective ones of said pockets; said elements each being pivotally mounted, with one portion in the pocket to be engaged by the entry of an egg therein, and a second portion normally constituting a light beam blocking portion; photoelectric source and detector actuator means oriented transversely of said conveyor adjacent said row forming means, operably associated with said power motor means to actuate it, and normally aligned with all of said second portions to prevent light beam transmission and detection; said elements being shiftable by the engagement of an egg with its one portion; second portions of said elements being individually shiftable from a first position blocking said light beam, with shifting of the respective elements, whereby the presence of the predetermined number of eggs in said pockets causes advancement of the eggs as a row.

5. In an egg handling apparatus including egg conveying means for advancing eggs in random orientation: egg row forming means transverse of said conveying means, and having a predetermined number of egg receiving pockets; individual egg retention and advancing means associated with each of said pockets including power means operably connected to all of said advancing means to operate them simultaneously; individually shiftable, pivotally mounted egg responsive means in each of said pockets; photoelectric source means and detector means oriented on a path transversely of said conveying means; said egg responsive means each having a light beam blocking flag portion, with all of said flag portions normally being biased to be aligned with said beam path; said egg responsive means being individually shiftable by an egg in the respective pocket to move its flag portion out of said path so that, with shifting of all of the egg responsive means, the light beam is detected by said detector means; timing relay means operatively electrically connected to said detector means and to said power means to trigger said power means momentarily and operate said retention and advancing means sufficient to advance one row of a predetermined number of eggs.

6. An egg packing apparatus comprising: egg accumulator means including feed conveyor means; egg row grouping means transverse to the direction of movement of said conveyor means and including a predetermined number of individual egg receiving channels; oscillatory egg distributing means at said accumulator means and adjacent said row grouping means to distribute eggs at said accumulator means to said pockets; egg row advancing means adjacent said row grouping means; in an egg handling apparatus, egg conveyor means including egg accumulator means positioned to receive eggs from upstream portions of said conveyor means, and egg row forming means positioned generally transversely with respect to said conveyor means and said accumulator means to receive eggs generally from said egg accumulator means and including a predetermined number of egg receiving pockets; egg distributor means adjacent said accumulator means and said egg row forming means to distribute accumulated eggs transversely to said pockets; said distributor means comprising an elongated egg pushing arm oriented generally along said conveyor means, transversely centrally thereof, and pivotally mounted on a vertical axis on its upstream end; means to sweep said arm in an oscillatory path back and forth of said accumulator means to distribute eggs laterally to all of said pockets; an egg guard fixedly mounted above said arm; said arm having a diamond shaped configuration with two legs convergent upstream and two legs convergent downstream with respect to said conveyor means to prevent egg crushing during arm oscillation; gate means at said pockets to regulate egg passage from said accumulator means to said egg row advancing means; power means to actuate said gate means at all said pockets simultaneously; a shiftable egg sensor in each of said pockets; photoelectric trigger means including a light beam source oriented transverse to said pockets and a light responsive receiver aligned therewith, light beam blocking means on each of said egg sensors, and each shiftable from a first beam blocking position between said source and receiver to a second non-blocking position, whereby shifting of all said blocking means by the predetermined number of eggs causes simultaneous actuation of said gate means for advancement of the predetermined number of eggs as a group.

7. In an egg handling apparatus, egg conveyor means including egg accumulator means positioned to receive eggs from upstream portions of said conveyor means, and egg row forming means positioned generally transversely with respect to said conveyor means and said accumulator means to receive eggs generally from said egg accumulator means and including a predetermined number of egg receiving pockets; egg distributor means adjacent said accumulator means and said egg row forming means to distribute accumulated eggs transversely to said pockets; said distributor means comprising an elongated egg pushing arm oriented generally along said conveyor means, transversely centrally thereof, and pivotally mounted on a vertical axis on its upstream end; means to sweep said arm in an oscillatory path back and forth of said accumulator means to distribute eggs laterally to all of said pockets; an egg guard fixedly mounted above said arm; said arm having a diamond shaped configuration, with two legs convergent upstream and two legs convergent downstream with respect to said conveyor means to prevent egg crushing during arm oscillation.

References Cited by the Examiner

UNITED STATES PATENTS

| 2,714,481 | 8/1955 | Bruce et al. | 53—61 |
| 2,853,108 | 9/1958 | Hait | 198—33 X |
| 2,855,740 | 10/1958 | Noland, et al. | 53—60 X |
| 3,169,354 | 2/1965 | Bliss et al. | 53—61 |

EVON C. BLUNK, *Primary Examiner.*

R. J. HICKEY, *Assistant Examiner.*